F. A. ALGER.
FISH BAIT.
APPLICATION FILED APR. 26, 1909.

956,872.

Patented May 3, 1910.

Witnesses
H. C. Van Antwerp
Georgiana Chace

Inventor
FRANKLIN A. ALGER
BY Luther V. Moulton
Attorney

UNITED STATES PATENT OFFICE.

FRANKLIN A. ALGER, OF GRAND RAPIDS, MICHIGAN.

FISH-BAIT.

956,872.  Specification of Letters Patent.  Patented May 3, 1910.

Application filed April 26, 1909. Serial No. 492,347.

*To all whom it may concern:*

Be it known that I, FRANKLIN A. ALGER, a citizen of the United States of America, residing at Grand Rapids, in the county of Kent and State of Michigan, have invented certain new and useful Improvements in Fish-Bait; and I do hereby declare the following to be a full, clear, and exact description of the invention, such as will enable others skilled in the art to which it appertains, to make and use the same.

My invention relates to improvements in fish bait, and its object is to provide the same with improved means for detachably securing the hooks thereto; to provide the device with means whereby it will normally float at the surface when not in motion, and will, when moved through the water, run below the surface to a greater or less extent; and to provide the same with various new and useful features hereinafter more fully described and particularly pointed out in the claims.

Figure 1:
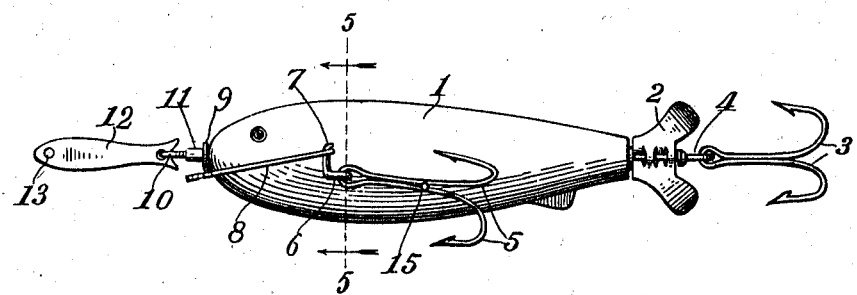
Figure 2:
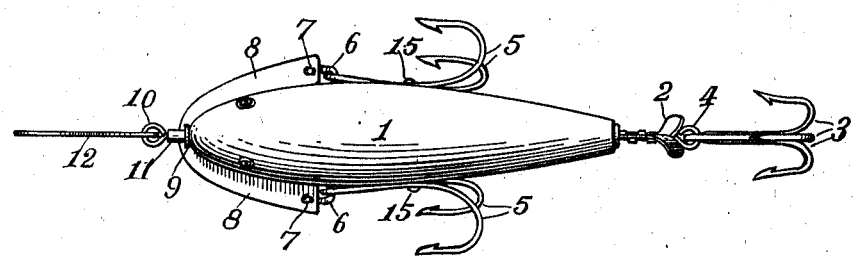
Figure 3:
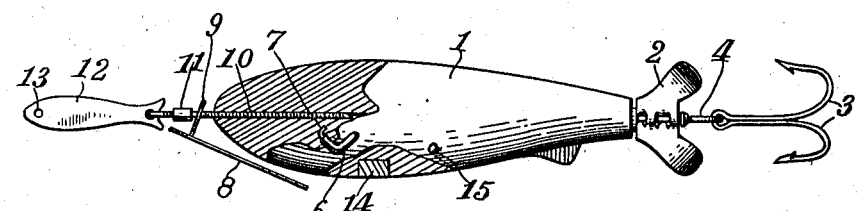
Figures 4, 5:
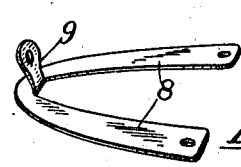

The device consists essentially of a fish-shaped body having side arms pivotally inserted therein, an inclined plate embracing the forward end of the device, and with the rear end of the same elevated and detachably engaging hooks on the arms, whereby fish hooks may be readily removed from and replaced upon the arms, and the device caused to dive beneath the surface of the water when drawn through the same, as will more fully appear by reference to the accompanying drawings, in which:

Figure 1 is a side elevation of a bait embodying my invention; Fig. 2 a plan view of the same; Fig. 3 a detail in side elevation with parts broken away; Fig. 4 a perspective detail of the inclined plate; and, Fig. 5 a transverse section of the device on the line 5—5 of Fig. 1.

Like numbers refer to like parts in all of the figures.

1 represents a fish-shaped body, preferably of wood, or some material lighter than water, ballasted by a weight 14 inserted therein, preferably of lead, whereby the body will assume an upright position in the water and float at the surface of the same when not in motion.

2 is a tail spinner, 3 are hooks, and 4 a screw eye on which the spinner and hooks are mounted. Double side hooks are provided, which hooks are detachably secured to the sides of the body by means of arms 6 rotative therein and extending forward and thence upward and inserted in the eye of the hooks. The upper ends of these arms are provided with rearwardly turned hooks 7 which extend through openings in the respective ends of a U-shaped plate 8, which plate embraces the forward end of the body and is provided with an up-turned eye 9 having an opening above the plane of the forward part of the plate, through which opening extends a screw eye 10 into the axis of the body, and provided with a collar 11 which binds the eye 9 firmly against the end of the body when the screw eye is turned into place. On this screw eye is a small sheet metal fish shaped plate 12, suggestive of a minnow, having at its forward end an opening 13 to which the fish line is attached.

15 are pins inserted in the sides of the body and embraced by the shanks of the hooks 5, which thus detachably hold the hooks in rearward position alongside of the body, and are detachable therefrom when struck by a fish.

When the parts are in the position shown in Figs. 1 and 2, the plate 8 is inclined downward at its forward part and upward at the rear and thus serves as an inclined plane to force the forward end of the device under water when drawn through the same. The device will thus float at the surface of the water when not moving, and when drawn through the water in trolling or otherwise, will run under the surface at proper distance to be correctly operative. By this means the bait will not sink to the bottom when not drawn through the water, which avoids entanglement in weeds and other obstructions, and will run a proper distance under the surface when moved forward through the water. By the construction shown, the plate 8 also locks the arms 6 in position, is supported thereby at the rear, and prevents removal of the hooks from the arms. By partially withdrawing the screw eye 10, the arms and rear of the plate can be turned downward and detached from each other, thus releasing the hooks as illustrated in Fig. 3, whereby broken hooks can be removed or different sizes put on, without any necessity of using tools.

What I claim is:—

1. A fish bait, comprising a body adapted to normally float at the surface of water, an integral U shaped plate embracing the front of the body, an eye in the front end of the body to which the middle of the plate is attached, and arms detachably securing the ends of the plate to the opposite sides of the body, and also adapted to attach hooks to the body.

2. A fish bait, comprising a fish shaped body, an eye inserted in the front end of the body, a U shaped integral plate embracing the front end of the body, an upwardly projecting eye on the front of the plate through which the shank of the first named eye extends, and detachable fastenings at the respective sides of the body engaging and supporting the rear ends of the plate in fixed upwardly and rearwardly inclined relation to the body.

3. A fish bait, comprising a fish-shaped body, an arm rotative in the body and projecting therefrom, a hook having an eye to receive the arm, and a plate engaged by the end of the arm to detachably secure the hook thereon.

4. A fish bait, comprising a body having arms rotatively inserted in its sides, an inclined plate detachably connected to the arms and supported thereby at the rear, and a screw to adjust and support the front of the plate.

5. A fish bait, comprising a fish-shaped body, arms pivoted in the sides of the body and extending forward and upward, a U-shaped plate having openings engaged by the arms, an eye on the forward part of the plate, and a screw inserted in the eye to support and hold the plate.

6. A fish bait, comprising a fish-shaped body, arms rotative in the sides of the body and extending forward and upward and terminating in hooks, a U-shaped plate embracing the front of the body and having openings to receive the hooks on the ends of the arms, an upturned eye on the front of the plate, and a screw extending through the eye and having a collar engaging the eye on the plate.

In testimony whereof I affix my signature in presence of two witnesses.

FRANKLIN A. ALGER.

Witnesses:
GEORGIANA CHACE,
LUTHER V. MOULTON.